United States Patent
Hamada

(10) Patent No.: US 9,251,851 B2
(45) Date of Patent: Feb. 2, 2016

(54) EDITING APPARATUS AND CONTROL METHOD THEREFOR

(71) Applicant: CANON KABUSHIKI KAISHA, Tokyo (JP)

(72) Inventor: Naru Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 14/279,019

(22) Filed: May 15, 2014

(65) Prior Publication Data

US 2014/0341546 A1    Nov. 20, 2014

(30) Foreign Application Priority Data

May 20, 2013  (JP) ................................. 2013-106592

(51) Int. Cl.
*H04N 5/93*        (2006.01)
*G11B 27/034*    (2006.01)

(52) U.S. Cl.
CPC .................................... *G11B 27/034* (2013.01)

(58) Field of Classification Search
CPC ............................. G11B 27/034; G11B 27/031
USPC .................. 386/282, 278, 289, 290, 323, 326
See application file for complete search history.

(56) References Cited

U.S. PATENT DOCUMENTS 7,765,369 B1 * 7/2010 Prahlad ................. G06F 3/0605
                                                                    707/692
2008/0082919 A1 * 4/2008 Kojima .............. H04N 1/00442
                                                                    715/700

FOREIGN PATENT DOCUMENTS

JP        2010-183248 A    8/2010

* cited by examiner

*Primary Examiner* — Robert Chevalier
(74) *Attorney, Agent, or Firm* — Cowan, Liebowitz & Latman, P.C.

(57) ABSTRACT

An editing apparatus comprises a selection unit configured to select one file included from a group of a plurality of files of predetermined continuity; a first instruction detection unit configured to detect a first instruction for deleting an anterior portion of time-series data in the file selected by the selection unit, the anterior portion preceding a designated position in time-series; and a processing unit configured to, if the first instruction is detected by the first instruction detection unit, perform processing for deleting a file preceding the selected file from the group of the plurality of files.

18 Claims, 13 Drawing Sheets

UID:1111
NID:0000
PID:0000

UID:1112  UID:1113  UID:1114
NID:1113  NID:1114  NID:0000
PID:0000  PID:1112  PID:1113

- 401
- ftyp
- moov — 402
- uuid — 404
- trak (video) — 405
- trak (audio) — 406
- mdat — 403

| TYPE | LENGTH (BYTE) | CONTENT |
|---|---|---|
| UniqueID | 16 | VALUE UNIQUE TO FILE |
| Next ID | 16 | UID OF NEXT FILE 0: LAST FILE |
| Pre ID | 16 | UID OF PRECEDING FILE 0: FIRST FILE |

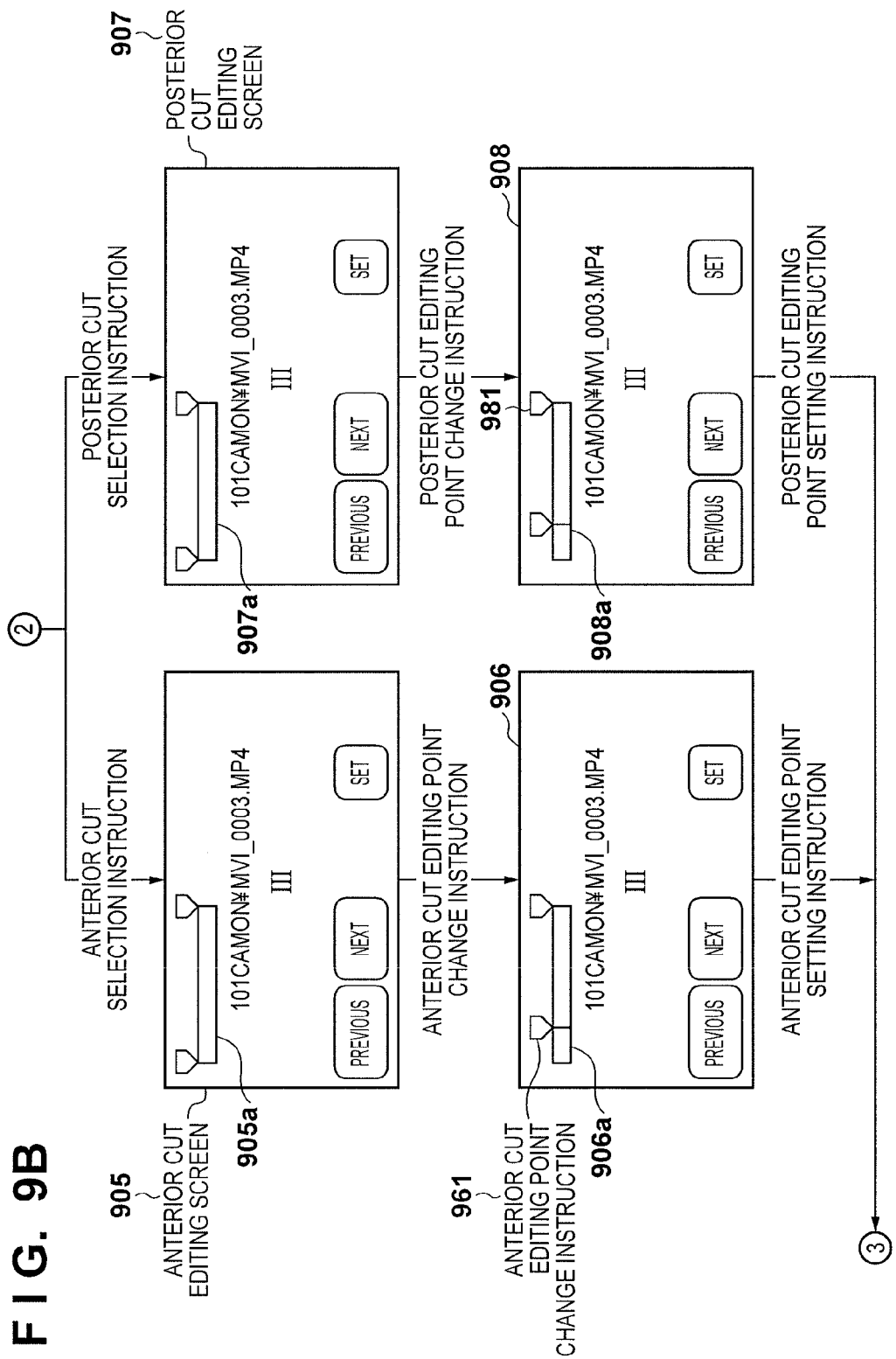

FIG. 10A

BEFORE EDITING

| FILE | UID | NID | PID |
|---|---|---|---|
| MVI_0001.MP4 | 1111 | 1112 | 0000 |
| MVI_0002.MP4 | 1112 | 1113 | 1111 |
| MVI_0003.MP4 | 1113 | 1114 | 1112 |
| MVI_0004.MP4 | 1114 | 1115 | 1113 |
| MVI_0005.MP4 | 1115 | 0000 | 1114 |
| MVI_0006.MP4 | 1116 | 0000 | 0000 |

FIG. 10B1

AFTER DELETION
(AFTER PROCESSING OF STEP S612 IS PERFORMED)

| FILE | UID | NID | PID |
|---|---|---|---|
| MVI_0001.MP4 | 1111 | 1112 | 0000 |
| MVI_0002.MP4 | 1112 | 0000 | 1111 |
| (DELETED) | (DELETED) | (DELETED) | (DELETED) |
| MVI_0004.MP4 | 1114 | 1115 | 1113 |
| MVI_0005.MP4 | 1115 | 0000 | 1114 |
| MVI_0006.MP4 | 1116 | 0000 | 0000 |

FIG. 10B2

AFTER DELETION
(AFTER PROCESSING IS ENDED)

| FILE | UID | NID | PID |
|---|---|---|---|
| MVI_0001.MP4 | 1111 | 1112 | 0000 |
| MVI_0002.MP4 | 1112 | 0000 | 1111 |
| (DELETED) | (DELETED) | (DELETED) | (DELETED) |
| MVI_0004.MP4 | 1114 | 1115 | 0000 |
| MVI_0005.MP4 | 1115 | 0000 | 1114 |
| MVI_0006.MP4 | 1116 | 0000 | 0000 |

FIG. 10C1

AFTER ANTERIOR CUT EDITING

| FILE | UID | NID | PID |
|---|---|---|---|
| MVI_0001.MP4 | 1111 | 1112 | 0000 |
| MVI_0002.MP4 | 1112 | 0000 | 1111 |
| MVI_0003.MP4 | 1113 | 1114 | 0000 |
| MVI_0004.MP4 | 1114 | 1115 | 1113 |
| MVI_0005.MP4 | 1115 | 0000 | 1114 |
| MVI_0006.MP4 | 1116 | 0000 | 0000 |

FIG. 10C2

AFTER POSTERIOR CUT EDITING

| FILE | UID | NID | PID |
|---|---|---|---|
| MVI_0001.MP4 | 1111 | 1112 | 0000 |
| MVI_0002.MP4 | 1112 | 1113 | 1111 |
| MVI_0003.MP4 | 1113 | 0000 | 1112 |
| MVI_0004.MP4 | 1114 | 1115 | 0000 |
| MVI_0005.MP4 | 1115 | 0000 | 1114 |
| MVI_0006.MP4 | 1116 | 0000 | 0000 |

FIG. 10D1

AFTER ANTERIOR CUT AND POSTERIOR CUT EDITING
(AFTER PROCESSING OF STEP S612 IS PERFORMED)

| FILE | UID | NID | PID |
|---|---|---|---|
| MVI_0001.MP4 | 1111 | 1112 | 0000 |
| MVI_0002.MP4 | 1112 | 0000 | 1111 |
| MVI_0003.MP4 | 1113 | 1115 | 0000 |
| MVI_0004.MP4 | 1114 | 0000 | 1113 |
| MVI_0005.MP4 | 1115 | 0000 | 1114 |
| MVI_0006.MP4 | 1116 | 0000 | 0000 |

FIG. 10D2

AFTER ANTERIOR CUT AND POSTERIOR CUT EDITING
(AFTER PROCESSING IS ENDED)

| FILE | UID | NID | PID |
|---|---|---|---|
| MVI_0001.MP4 | 1111 | 1112 | 0000 |
| MVI_0002.MP4 | 1112 | 0000 | 1111 |
| MVI_0003.MP4 | 1113 | 0000 | 0000 |
| MVI_0004.MP4 | 1114 | 1115 | 0000 |
| MVI_0005.MP4 | 1115 | 0000 | 1114 |
| MVI_0006.MP4 | 1116 | 0000 | 0000 |

EDITING APPARATUS AND CONTROL METHOD THEREFOR

BACKGROUND OF THE INVENTION

1. Field of the Invention

The present invention relates to an editing apparatus and a control method therefor.

2. Description of the Related Art

A recording apparatus for recording moving image data and audio data into a recording medium is conventionally known. A recording apparatus of this sort manages recorded moving image data and audio data as a file in accordance with a predetermined file system. For example, Japanese Patent Laid-Open No. 2010-183248 suggests file break recording in which a file of moving image data is recorded by dividing the moving image data into files each having a file size that does not exceed the maximum size specified by a file system during a recording of moving image data and audio data. Furthermore, in general, editing of a moving image file incorporates trimming processing for cutting away a portion preceding an editing point of a scene (anterior cut), and trimming processing for cutting away a portion succeeding an editing point of a scene (posterior cut).

However, in the case where a user edits a file group that has been recorded according to the file break recording, Japanese Patent Laid-Open No. 2010-183248 mentioned above allows editing of a portion of divided files, but does not offer a technique to correct joint relationships with other relevant files. For example, in the case where a file has been divided into and recorded as three files, if the anterior cut processing is applied to the second file among the three files, there is a possibility that the first file, which represents an anterior portion of the files belonging to the same group, is also unnecessary. However, a technique to confirm with the user whether or not the first file is unnecessary and to perform the deletion is not offered.

Furthermore, when the group of divided files is merged after the user has performed the editing, continuity between the aforementioned first file and the second file, to which the anterior cut editing has been applied, must be broken. In this case, the user needs to confirm whether or not to merge them as continuous files and designate files that should be merged.

SUMMARY OF THE INVENTION

The present invention has been made in consideration of the aforementioned problems, and realizes a technique that allows a user to edit a file group that has been recorded according to file break recording, in which each file is recorded as a divided file, with the recognition of relationships among the divided files.

In order to solve the aforementioned problems, the present invention provides an editing apparatus comprising: a selection unit configured to select one file included from a group of a plurality of files of predetermined continuity; a first instruction detection unit configured to detect a first instruction for deleting an anterior portion of time-series data in the file selected by the selection unit, the anterior portion preceding a designated position in time-series; and a processing unit configured to, if the first instruction is detected by the first instruction detection unit, perform processing for deleting a file preceding the selected file from the group of the plurality of files.

In order to solve the aforementioned problems, the present invention provides an editing apparatus comprising: a selection unit configured to select one file included from a group of a plurality of files of predetermined continuity; a second instruction detection unit configured to detect a second instruction for deleting a posterior portion of time-series data in the file selected by the selection unit, the posterior portion succeeding a designated position in time-series; and a processing unit configured to, if the second instruction is detected by the second instruction detection unit, delete a file succeeding the selected file from the group of the plurality of files.

In order to solve the aforementioned problems, the present invention provides a control method of an editing apparatus comprising: a selection step of selecting one file included from a group of a plurality of files of predetermined continuity; a first instruction detection step of detecting a first instruction for deleting an anterior portion of time-series data in the file selected in the selection step, the anterior portion preceding a designated position in time-series; and a processing step of, if the first instruction is detected in the first instruction detection step, performing processing for deleting a file preceding the selected file from the group of the plurality of files.

In order to solve the aforementioned problems, the present invention provides a control method of an editing apparatus comprising: a selection step of selecting one file included from a group of a plurality of files of predetermined continuity; a second instruction detection step of detecting a second instruction for deleting a posterior portion of time-series data in the file selected in the selection step, the posterior portion succeeding a designated position in time-series; and a processing step of, if the second instruction is detected in the second instruction detection step, deleting a file succeeding the selected file from the group of the plurality of files.

According to the present invention, the user can edit a file group that has been recorded according to file break recording, in which each file is recorded as a divided file, with the recognition of relationships among the divided files, and re-set the joint relationships among the files after the editing has been performed.

Further features of the present invention will become apparent from the following description of exemplary embodiments (with reference to the attached drawings).

BRIEF DESCRIPTION OF THE DRAWINGS

FIGS. 9A-9D show examples of editing screens according to the present embodiment.

FIGS. 10A, 10B1, 10B2, 10C1, 10C2, 10D1, and 10D2 show the states of files due to the editing processing according to the present embodiment.

DESCRIPTION OF THE EMBODIMENTS

The following is a detailed description of an embodiment in which an editing apparatus according to the present invention is applied to a recording apparatus for recording moving image data and audio data into a recording medium with reference to the drawings.

<Apparatus Configuration>

First, a configuration and functions of a recording apparatus 100 according to the present embodiment will be described with reference to FIG. 1.

Figure 1:
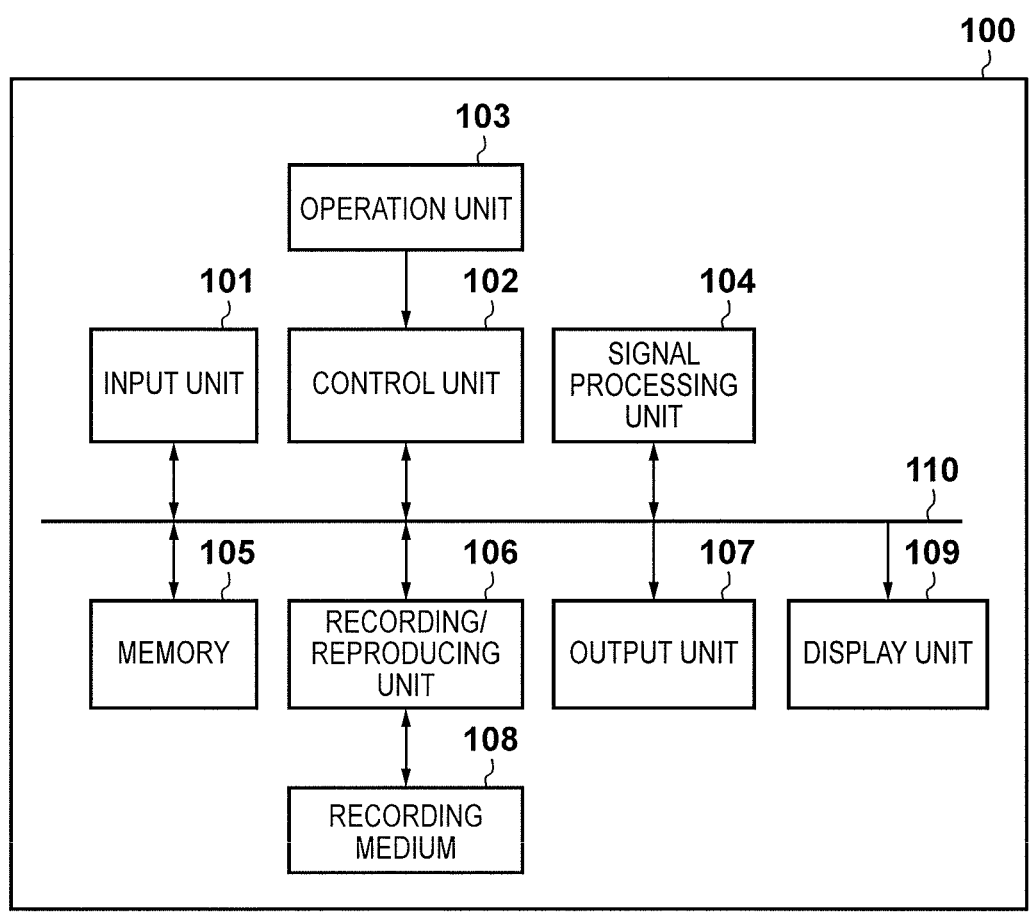
FIG. 1 is a block diagram showing an apparatus configuration according to the present embodiment.

In FIG. 1, an input unit 101 acquires and outputs moving image data and audio data. While the input unit 101 inputs moving image data and audio data supplied externally from the outside of the recording apparatus 100 in the present embodiment, the input unit 101 may be configured to include an image capturing unit and a microphone and to acquire audio data via the microphone as well as captured moving images.

A control unit 102 controls the entire recording apparatus 100 in accordance with input from an operation unit 103. The control unit 102 includes, for example, a microcomputer and a memory, and controls the recording apparatus 100 in accordance with computer programs (software) stored in a non-volatile memory, which is not shown in the drawings. Furthermore, a recording medium interface for communicating with a recording/reproducing unit 106 for data and commands is built in the control unit 102. The operation unit 103 includes various types of switches that can be operated by a user. The operation unit 103 accepts, for example, various types of instructions from the user and notifies the control unit 102 of the same. For example, the operation unit 103 includes a power switch, switches for issuing instructions for starting and stopping the recording, and switches for switching between operation modes of the recording apparatus 100.

In a recording mode, a signal processing unit 104 encodes moving image data and audio data input from the input unit 101 in accordance with a known encoding format, such as MPEG, thereby compressing the information amount thereof. It also performs processing necessary for recording the moving image data and audio data. At the time of reproduction, the signal processing unit 104 decodes moving image data and audio data that have been reproduced, thereby decompressing the information amount thereof. In the recording mode, the signal processing unit 104 also outputs information of the encoding amounts (data amounts) of the encoded moving image data and audio data to the control unit 102.

A memory 105 stores moving image data and audio data. Blocks in the recording apparatus 100 process the moving image data and audio data via access to the memory 105. The memory 105 also stores various types of information, such as information of a file system and management information, in addition to the moving image data and audio data, and further serves as, for example, a working memory for control by the control unit 102.

The recording/reproducing unit 106 writes or reads moving image data and audio data, or various types of information, into or from a recording medium 108. In the recording mode, the recording/reproducing unit 106 writes moving image data and audio data accumulated in the memory 105 into the recording medium 108. In a reproducing mode, the recording/reproducing unit 106 reads moving image data and audio data from the recording medium 108 and stores them into the memory 105. In the present embodiment, the recording medium 108 is a random-access recording medium, such as a hard disk drive (HDD) and a flash memory card.

The recording/reproducing unit 106 manages moving image data, audio data, and various types of information recorded into the recording medium 108 as a file in accordance with a file system, such as FAT (File Allocation Table).

The recording/reproducing unit 106 includes a known interface (IF), such as ATA (AT attachment), and communicates with a recording medium IF in the control unit 102 for data and various types of commands. While the recording medium 108 is easily attachable to and detachable from the recording apparatus 100 due to an attachment/detachment mechanism, which is not shown in the drawings, the recording medium 108 may be built in the recording apparatus 100.

In order to write and read a moving image file including moving image data and audio data into and from the recording medium 108, the control unit 102 controls the recording/reproducing unit 106 to reproduce file system data (management data) from the recording medium 108 and store the reproduced file system data into the memory 105. This file system data is information that is indicative of the name and size of a file of data recorded in the recording medium 108, a recording address of the data, and the like, and is used for managing the file. The control unit 102 controls writing and reading of the file in accordance with the file system data read from the recording medium 108. The control unit 102 updates the file system data stored in the memory 105 in accordance with the status of writing of the file into the recording medium 108. Then, it records the updated file system data into the recording medium 108 via the recording/reproducing unit 106.

In the present embodiment, a moving image file is recorded into the recording medium 108 with a UUID (Universally Unique Identifier) added thereto. A UUID is identification information for uniquely identifying an individual moving image file. Each time a moving image file is newly generated, the control unit 102 generates a UUID of a different value. Therefore, an individual moving image file can easily be identified by checking the value of its UUID recorded in the recording medium 108.

Furthermore, the user can provide instructions for switching between the operation modes of the recording apparatus 100, starting and stopping the recording of moving image data, and the like by operating the operation unit 103. An output unit 107 outputs moving image data and audio data that have been reproduced to, for example, a display apparatus external to the recording apparatus 100. A display unit 109 displays moving images and various types of information on a display apparatus, such as a liquid crystal panel. A data bus 110 is used for transmission and reception of data, various types of control commands, and the like between the components of the recording apparatus 100.

<Recording Processing>

A description is now given of recording processing for moving image data according to the present embodiment. It should be noted that the recording processing is realized by the control unit 102 deploying a control program stored in a non-volatile memory, which is not shown in the drawings, to the memory 105 and executing the deployed control program.

First, upon receiving an instruction for switching to the recording mode from the operation unit 103, the recording apparatus 100 shifts to a recording standby state and waits for an instruction for starting the recording. In this recording standby state, moving image data input from the input unit 101 is displayed on the display unit 109. If the instruction for starting the recording is input from the operation unit 103, the signal processing unit 104 reads moving image data that has been input from the input unit 101 and stored in the memory 105, and starts to encode the moving image data. The data encoded by the signal processing unit 104 is stored into the memory 105.

In the present embodiment, the data rate of the data encoded by the signal processing unit 104 is lower than the data rate at which the recording can be performed with respect to the recording medium 108, and therefore the encoded data is stored into the memory 105 at first. Then, each time the data amount of the encoded data stored in the memory 105 reaches a first predetermined amount, the recording/reproducing unit 106 reads the encoded data from the memory 105 and records the read encoded data into the recording medium 108. When the encoded data stored in the memory 105 has decreased to a second predetermined amount that is smaller than the first predetermined amount, reading of the encoded data from the memory 105 is temporarily stopped, and processing for the recording into the recording medium 108 is interrupted. The aforementioned processing is repeatedly performed. At this time, if a file has not been opened, a file into which encoded data is to be newly recorded is generated and opened, and encoded data is recorded as a moving image file.

Each time the single writing into the recording medium 108 is completed, the control unit 102 updates the file system data (management information) stored in the memory 105 based on, for example, a recording position of encoded data that was most recently written. The control unit 102 then controls the recording/reproducing unit 106 to read the updated file system data from the memory 105 and record the read file system data into the recording medium 108.

The control unit 102 also generates a UUID having a numeric value of a predetermined bit length by combining, for example, a serial number of the recording apparatus 100, the date and time of the recording, the total number of times the recording has been performed since the start of the use of the apparatus, and random numbers that have been prepared in advance. As will be described later, this UUID is added to a management information area of the moving image file as identification information unique to this file (unique ID), and recorded. Each time a moving image file is newly generated in response to reception of an instruction for starting the recording, the control unit 102 generates a UUID of a different value.

Figures 4, 5:
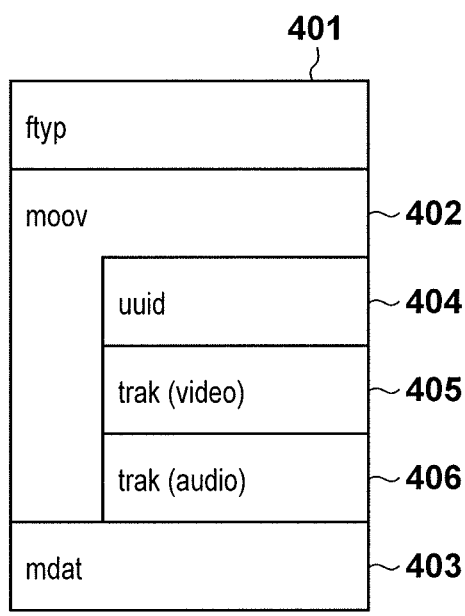
FIG. 4 shows a data structure of a moving image file.
FIG. 5 shows a data structure of identification information.

In the present embodiment, a moving image file is recorded in accordance with the MP4 file format. FIG. 4 shows an exemplary structure of an MP4 file. MP4 has a tree structure shown in FIG. 4 and includes elements referred to as boxes.

An ftyp box 401, a moov box 402, and an mdat box 403 exist as boxes of the topmost layer. The ftyp box 401 stores compatibility information, and the moov box 402 stores management information related to moving image data and audio data. The mdat box 403 stores the actual moving image data and audio data. The recording is performed while additionally writing the moving image data and audio data into the mdat box 403.

The moov box 402 stores a plurality of trak boxes 405, 406 and a uuid box 404. In the present embodiment, an ID unique to an individual moving image file (unique ID) is stored in the uuid box 404. Furthermore, in the case where a moving image file that is being recorded is closed so as to newly record a moving image file, additional information for identifying an immediately-succeeding file (first additional information) and additional information for identifying an immediately-preceding file (second additional information) are generated and stored into the uuid box 404.

FIG. 5 shows the contents of identification information stored in the uuid box 404. A UniqueID (UID) has a length of 16 bytes and stores a value unique to an individual moving image file. More specifically, it stores a value of a UUID. In the case where a plurality of moving image files are recorded during the single recording from a user's instruction for starting the recording to a user's instruction for stopping the recording, a NextID (NID) stores a value of identification information (UID) of the next file. In the case of the last file in the single recording, a predetermined value, e.g., 0 in the present case, is stored. In the case where a plurality of moving image files are recorded during the single recording, a PreID (PID) stores a value of identification information (UID) of a preceding file. In the case of the first file in the single recording, a predetermined value, e.g., 0 in the present case, is stored.

In the present embodiment, the control unit 102 monitors a file size of a file that is being recorded based on notifications from the recording/reproducing unit 106 and the signal processing unit 104. If the file size of the file that is being recorded reaches a threshold for determining whether or not to perform file break recording (file division threshold), the control unit 102 closes the file that is being recorded, newly generates a moving image file, and continues the recording. In the present embodiment, the file division threshold is determined based on the maximum file size that has been determined in advance by the file system. Specifically, in the present embodiment, a value of the file division threshold is smaller by a predetermined amount than the maximum file size.

In the case where a FAT32 file system is used, there is a restriction that the maximum file size of a single file is 4 gigabytes (GB), and therefore a value of the file division threshold is set to be smaller by a predetermined amount than the maximum file size, that is to say, 4 GB.

If the file size reaches the file division threshold during the recording, the control unit 102 instructs the recording/reproducing unit 106 to close the file that is currently being opened, open a new file, and continue the recording of encoded data.

As has been described above, each time the file size reaches the file division threshold during the recording of moving image data, the recording is continued by dividing the file.

If an instruction for stopping the recording is received from the operation unit 103 during the recording of moving image data, the control unit 102 stops encoding of the moving image data via the signal processing unit 104, and closes the file that is being recorded via the recording/reproducing unit 106. Then, it instructs the recording/reproducing unit 106 to change the contents of the file system data and record the changed file system data into the recording medium 108.

<Flow of Recording Processing>

Figure 2:
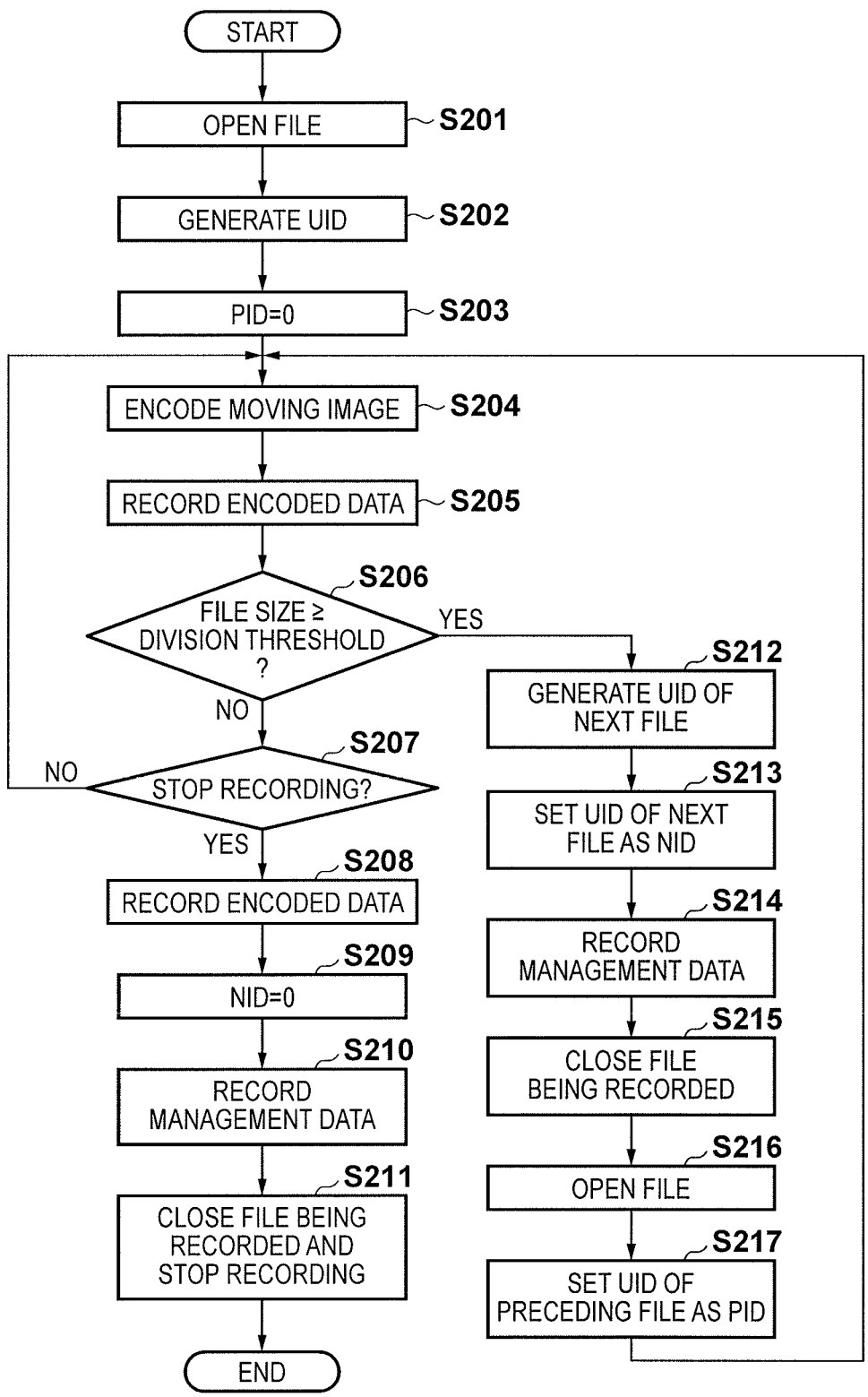
FIG. 2 is a flowchart showing recording processing according to the present embodiment.

The following describes the recording processing according to the present embodiment with reference to FIG. 2.

The processing of FIG. 2 is started when an instruction for starting the recording is received from the operation unit 103 in the recording standby state.

First, the control unit 102 instructs the recording/reproducing unit 106 to open a moving image file (step S201). Next, the control unit 102 generates identification information (UID) of the moving image file to be recorded and stores the generated identification information into the memory 105 (step S202). The control unit 102 also sets 0 as a PID of the moving image file to be recorded and stores the PID into the memory 105 (step S203).

Thereafter, the control unit 102 controls the signal processing unit 104 to start the encoding of moving images and audio data (step S204) and store the encoded data into the memory 105. The control unit 102 also instructs the signal processing unit 104 to generate a thumbnail image (representative image) by reducing the first frame following the start of the recording. The signal processing unit 104 generates thumbnail image data by reducing the first frame and stores the generated thumbnail image data into the memory 105.

If the data amount of the unrecorded encoded data that has been stored in the memory 105 reaches the first predetermined amount for writing, the control unit 102 instructs the recording/reproducing unit 106 to perform the writing. The recording/reproducing unit 106 reads the encoded data from the memory 105 and records the read encoded data into the recording medium 108 (step S205). If the data amount of the unrecorded encoded data that has been stored in the memory 105 falls below the second predetermined amount for stopping the writing, the control unit 102 instructs the recording/reproducing unit 106 to stop the writing, thereby temporarily stopping the writing of the encoded data into the recording medium 108.

Upon the end of single writing processing, the control unit 102 determines whether or not the file size of the moving image file that is currently being recorded has become equal to or larger than the file division threshold (step S206). If the file size has not reached the file division threshold, the recording processing returns to step S204 and continues (step S207).

If the file size has become equal to or larger than the file division threshold in step S206, the control unit 102 generates a UID of the next moving image file, stores the generated UID into the memory 105 (step S212), and sets the value of the UID of the next file as an NID of the moving image file that is currently being recorded (step S213). Then, the control unit 102 controls the recording/reproducing unit 106 to store management data including the UID, NID, PID, and thumbnail image data stored in the memory 105 into the moov box 402, and record the same into the recording medium 108. Thereafter, the control unit 102 controls the recording/reproducing unit 106 to close the moving image file that is being recorded (step S215) and open a new moving image file (step S216). It further sets the UID of the moving image file that was most recently closed as a PID of the moving image file that was newly generated, stores the PID into the memory 105, and returns to step S204 so as to continue the processing (step S217). It should be noted that, in the above-described processing, the settings may be performed without using a PID. In this case, it is sufficient to, for example, set −1 as the PID in step S203 of FIG. 2 and skip the processing of step S217.

The moov box 402 also stores information showing an offset (data amount) from a start of a file per predetermined unit of moving image data and audio data stored in the mdat box 403, and other data necessary for reproduction. Furthermore, in the present embodiment, a file name including a number is added to an individual file. A file number is incremented by one when a file is newly generated.

If an instruction for stopping the recording is detected in step S207, the control unit 102 controls the recording/reproducing unit 106 to record the unrecorded encoded data, that is stored in the memory 105 at the time, into the recording medium 108 (step S208). Then, the control unit 102 sets 0 as the NID of the moving image file that is currently being recorded, and stores the NID into the memory 105 (step S209). Furthermore, the control unit 102 controls the recording/reproducing unit 106 to store management data including the UID, NID, and PID stored in the memory into the moov box 402, record the same into the recording medium 108 (step S210), close the file that is being recorded, and stop the recording (step S211).

Figure 3A:
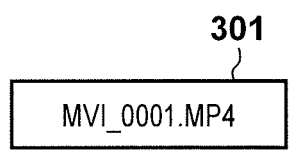
FIGS. 3A and 3B show the states of moving image files recorded in the recording processing according to the present embodiment.
Figure 3B:
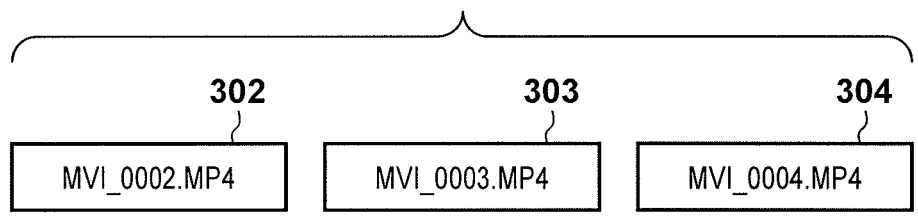

FIGS. 3A and 3B show the states of moving image files recorded in the recording processing according to the present embodiment. FIG. 3A shows the contents of a moving image file for the case where a plurality of moving image files are not recorded between an instruction for starting the recording and an instruction for stopping the recording. A moving image file 301 is generated in response to the start of the recording, and the instruction for stopping the recording is provided before the size of this moving image file 301 reaches the file division threshold. In this case, for example, "1111" is stored as a UID, and 0 (0000) is stored as an NID and a PID.

On the other hand, FIG. 3B shows the contents of three moving image files that are recorded as a divided file between an instruction for starting the recording and an instruction for stopping the recording. A moving image file 302 is generated in response to the start of the recording. When the size of this moving image file 302 reaches the file division threshold, the file 302 is closed, and a file 303 is newly generated. For example, "1112" is stored as a UID of the file 303, and "1113", which is a UID of the next file, is stored as an NID. As the file 302 is the first file following the start of the recording, 0 (0000) is stored as a PID. Then, when the size of the file 303 reaches the file division threshold, the file 303 is closed, and a file 304 is newly generated. For example, "1114" is stored as a UID of the file 304, and "1112", which is the UID of the preceding file 302, is stored as a PID. If an instruction for stopping the recording is provided during the recording of the file 303, "1113", which is the UID of the file 303, is stored as a PID of the file 304. Furthermore, as the file 304 is the last file in the single recording, 0 is stored as an NID.

As has been described above, in the present embodiment, if a plurality of moving image files are recorded as a divided file during single recording, identification information of immediately preceding and succeeding files is stored in the moving image files as additional information and recorded. This enables easy recognition of a moving image file group that has been divided and recorded in single recording.

While an NID of a moving image file that is being recorded is set when the recording is stopped or when the file size reaches the file division threshold in the present embodiment, the NID may be set at the time of generating the file. For example, if a UID of the next moving image file can be generated at the time of generating the file, this UID of the next moving image file is set as an NID and recorded into the recording medium 108 together with a PID. If an instruction for stopping the recording is provided during the recording of this moving image file, the value of the NID that has already been recorded is changed to a predetermined value (0).

Alternatively, at the time of generating the file, 0 is set as the value of the NID and the NID is recorded together with the PID. If the size of this moving image file reaches the file division threshold, the value of the NID is changed based on the UID of the next moving image file.

<Reproduction Processing>

A description is now given of reproduction processing according to the present embodiment. It should be noted that the reproduction processing is realized by the control unit 102 deploying a control program stored in a non-volatile memory, which is not shown in the drawings, to the memory 105 and executing the deployed control program.

Upon receiving an instruction for switching to the reproducing mode from the operation unit 103, the control unit 102 detects a plurality of scenes recorded in the recording medium 108 for the recording/reproducing unit 106. Then, the control unit 102 instructs the recording/reproducing unit 106 to read thumbnail image data of the scenes and store the read thumbnail image data into the memory 105. It also generates an index screen composed of the thumbnail images of the plurality of scenes and displays the generated index screen on the display unit 109.

At this time, the control unit 102 checks the values of NIDs and PIDs of moving image files corresponding to the thumbnail images displayed on the index screen. The control unit 102 detects whether or not the moving image files are a plurality of moving image files that have been recorded during single recording. The control unit 102 changes the display of the index screen such that the user can identify that the moving image files are the plurality of moving image files that have been recorded in accordance with a single recording instruction.

For example, in the case where three moving image files 302 to 304 are recorded during single recording as shown in FIG. 3B, thumbnail images of these files are displayed on the display unit 109.

Next, the user operates the operation unit 103 to select a desired representative image from among the representative images displayed on the index screen and provide a reproduction instruction. Upon receiving the reproduction instruction, the control unit 102 instructs the recording/reproducing unit 106 to reproduce the moving image file of a scene corresponding to the selected representative image. Here, if the thumbnail image of the file 302 is selected, the control unit 102 instructs the recording/reproducing unit 106 to reproduce the file 303 following the moving image file 302. The recording/reproducing unit 106 reproduces the moving image file of the selected scene from the recording medium 108. The signal processing unit 104 decodes the reproduced moving image file, displays the moving image file on the display unit 109, and outputs the moving image file to the outside via the output unit 107.

The control unit 102 reproduces the last file that has been recorded in the single recording, that is to say, a file with an NID set to 0, to the end, or if an instruction for stopping the reproduction is provided, stops the reproduction of the moving image file; thereafter, it displays the index screen again.

As has been described above, in the present embodiment, if a plurality of moving image files are recorded during single recording, identification information of an immediately preceding or succeeding file is stored in the moving image files as additional information and recorded. This enables easy recognition of a moving image file group of which each file has been recorded in a divided file in single recording.

While the file division threshold is a predetermined file size in the present embodiment, the file division threshold may be, for example, a predetermined recording time length of a moving image file, and a file may be divided each time moving image data of the predetermined time is recorded. The control unit 102 counts time that has elapsed since the recording was started in accordance with generation of a new file, and if the predetermined time has elapsed, outputs an instruction for dividing a file to the recording/reproducing unit 106. While the present embodiment has described an apparatus for recording moving image data and audio data, the present invention is similarly applicable to an apparatus for recording other input information/data.

Furthermore, while moving image data and audio data are recorded in the MP4 file format in the present embodiment, they may be recorded in other file formats, such as the MOV file format.

<Editing Processing>

Figure 6:
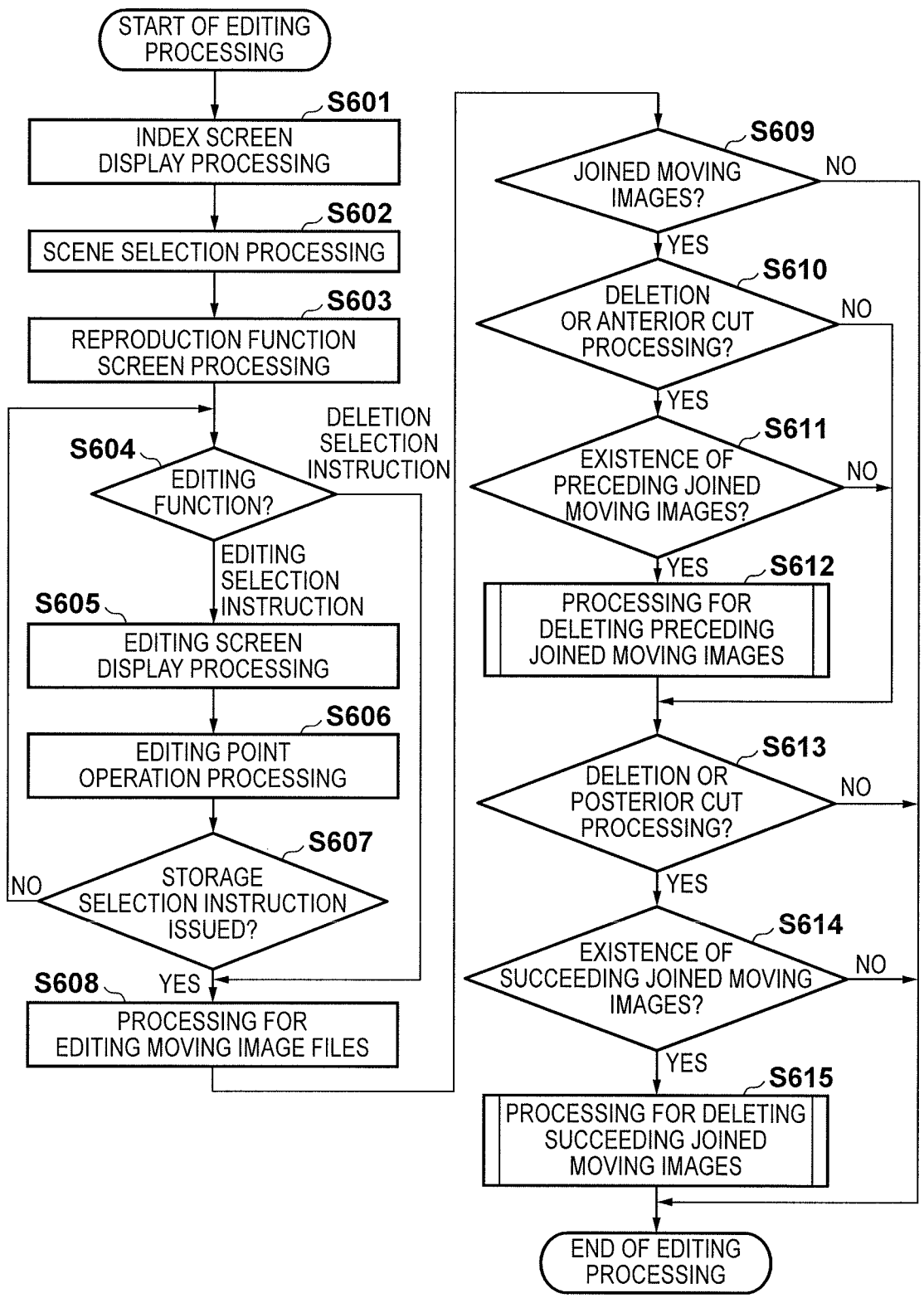
FIG. 6 is a flowchart showing editing processing according to the present embodiment.

The following describes editing processing according to the present embodiment with reference to FIGS. 6 to 10D2. It should be noted that processing of FIGS. 6 to 8 is realized by the control unit 102 deploying a control program stored in a non-volatile memory, which is not shown in the drawings, to the memory 105 and executing the deployed control program.

Figure 7:
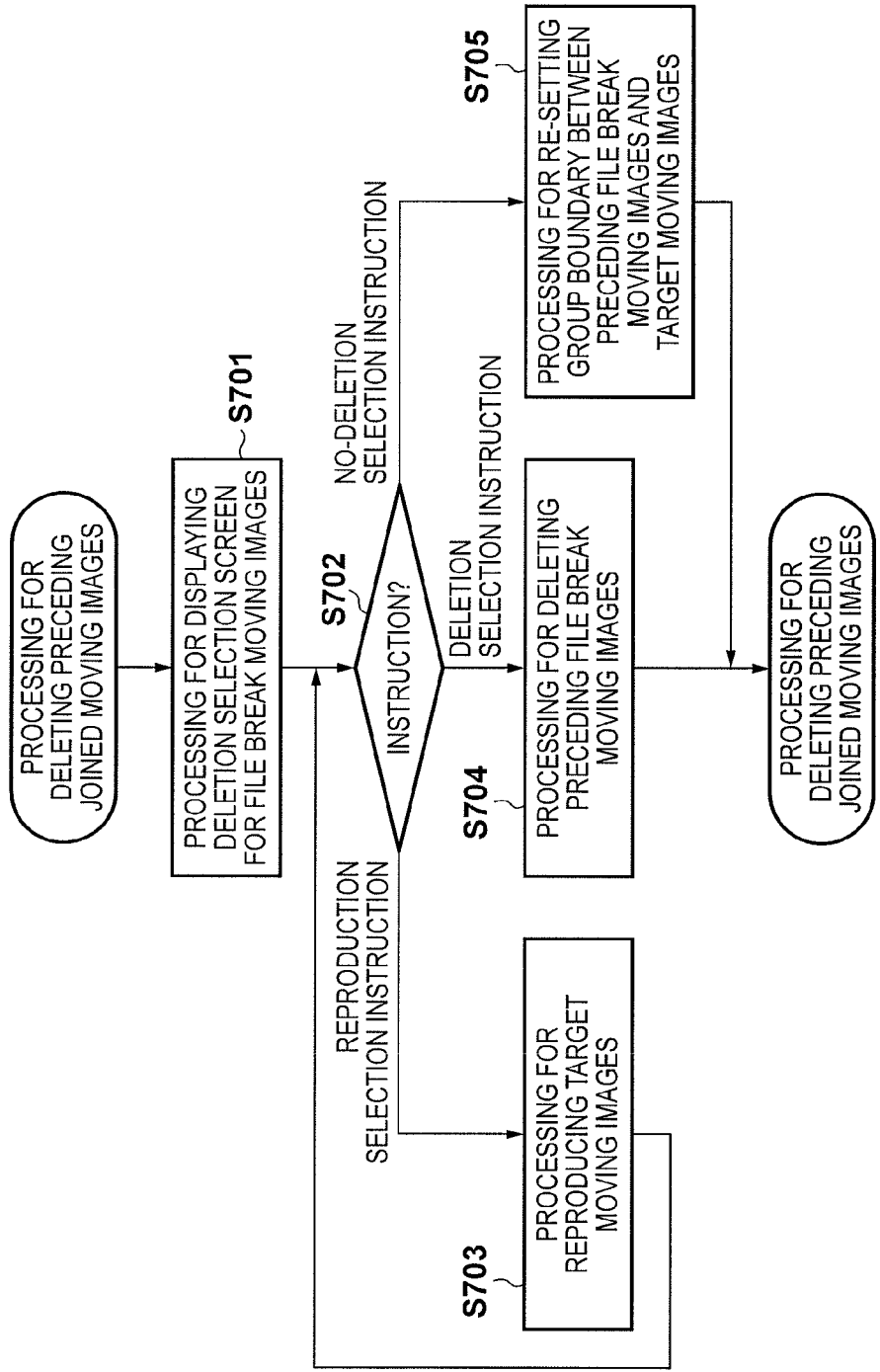
FIG. 7 is a flowchart showing the details of processing of step S612 in FIG. 6.
Figure 8:
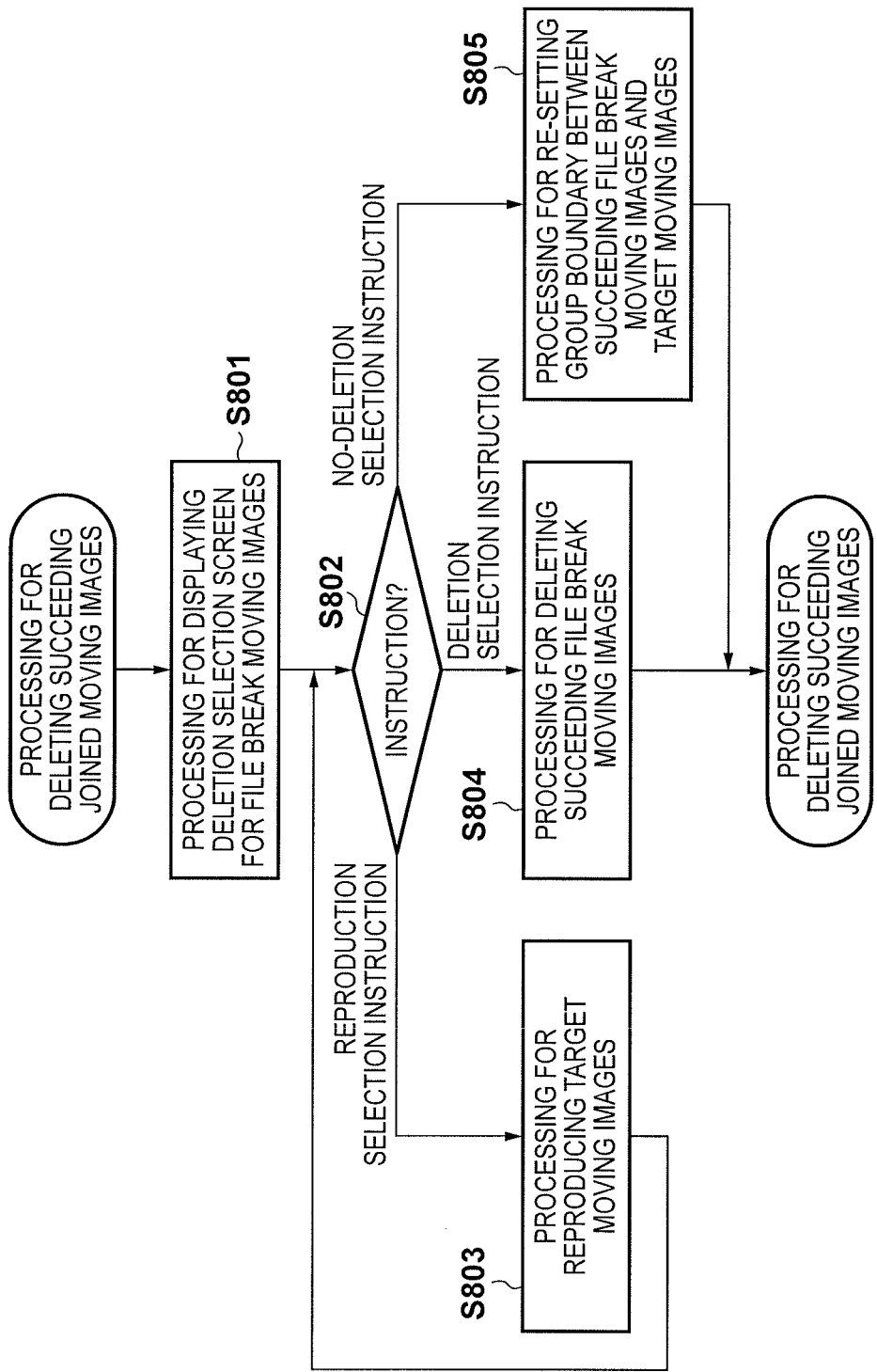
FIG. 8 is a flowchart showing the details of processing of step S615 in FIG. 6.
Figure 9A:
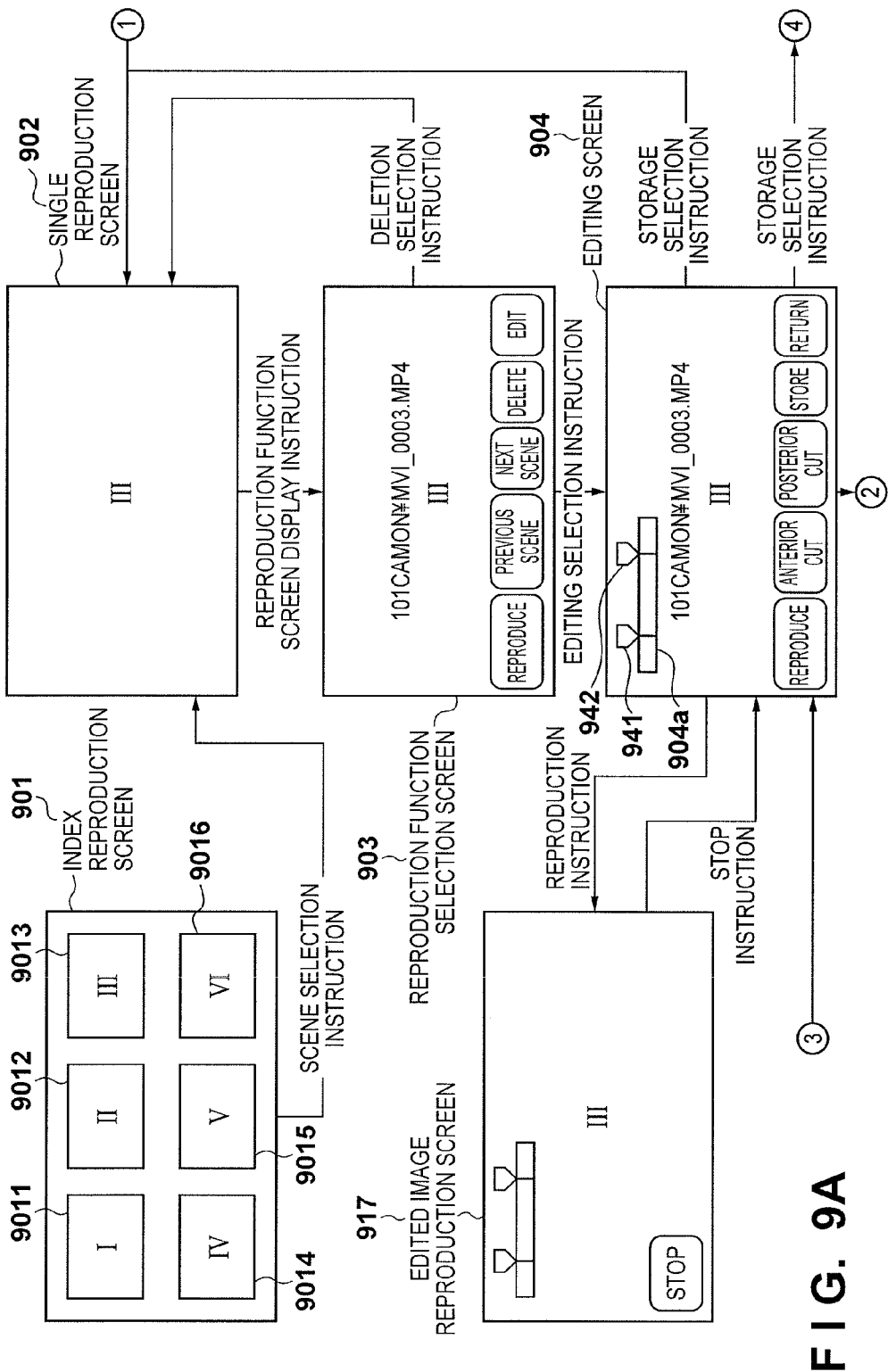
Figure 9C:
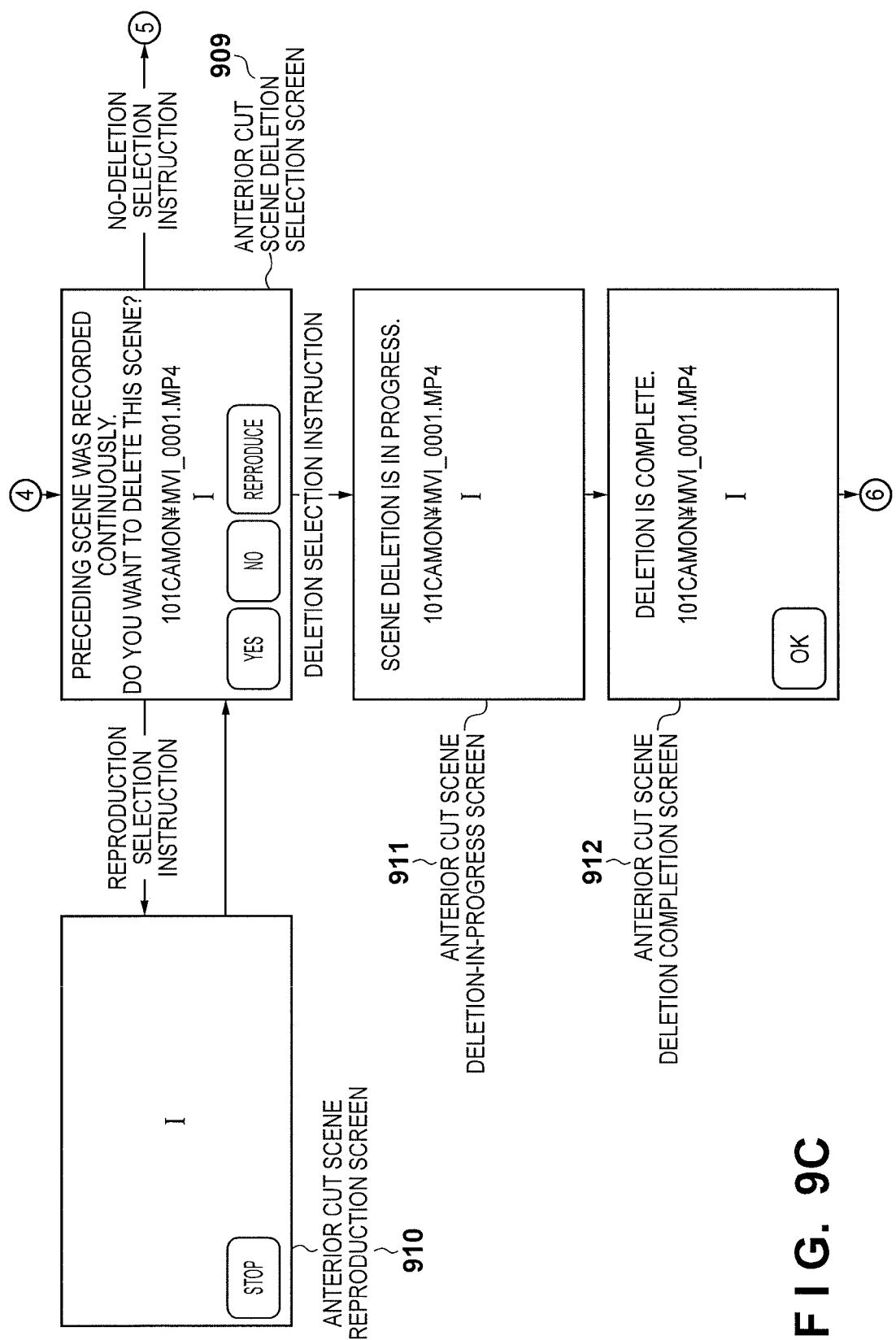
Figure 9D:
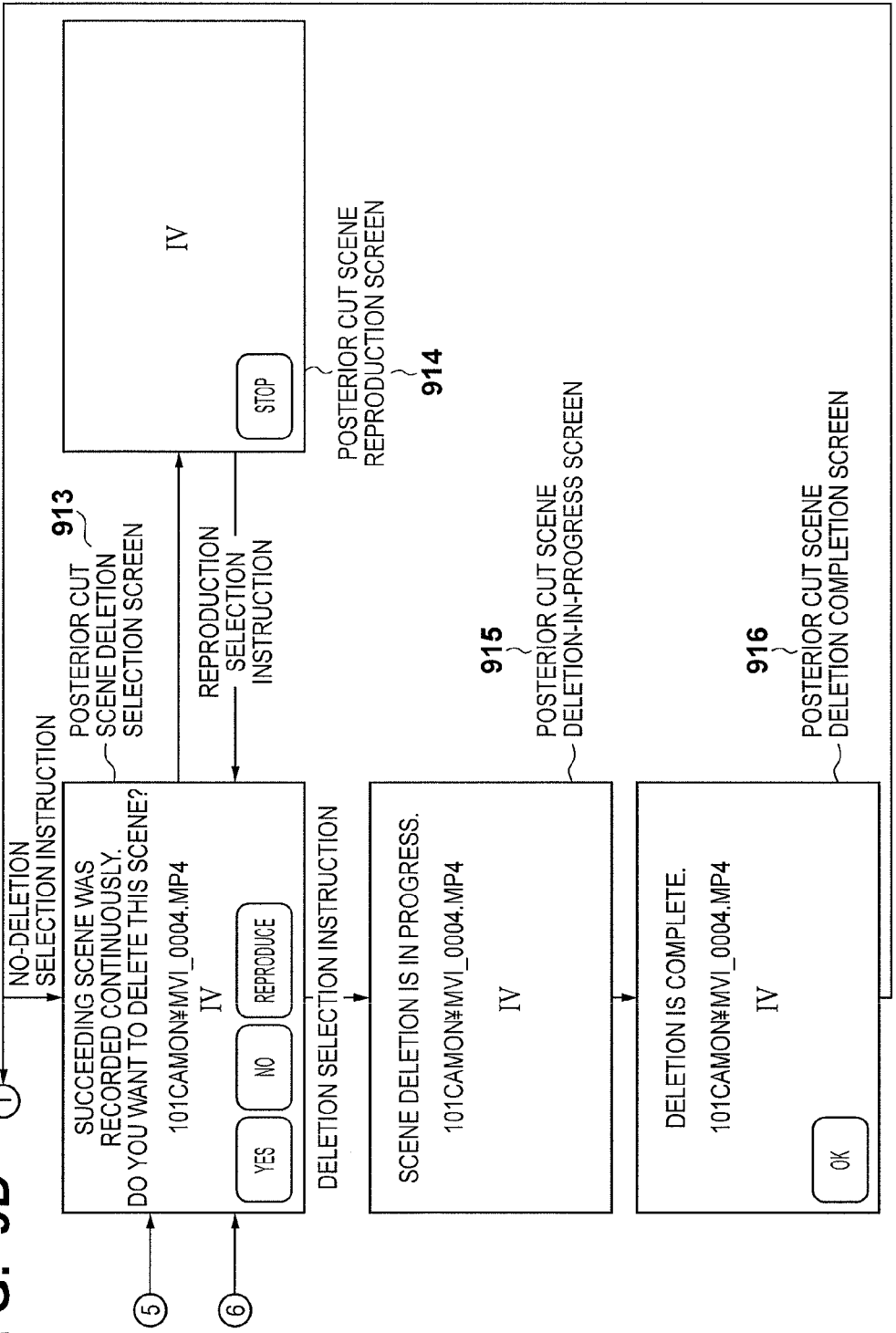

FIGS. 6 to 8 are flowcharts showing the editing processing according to the present embodiment. FIGS. 9A-9D exemplarily show the transition of editing screens, and FIGS. 10A to 10D2 show the states of files due to the editing processing according to the present embodiment.

First, upon receiving an instruction for switching to the reproducing mode from the operation unit 103, the control unit 102 reads thumbnail image data of scenes and displays the read thumbnail image data on the display unit 109 through the above-described reproduction processing.

The following describes an exemplary case where six moving image files shown in FIGS. 10A to 10D2 are edited.

FIG. 10A shows files of scenes at the time of starting the reproduction, that is to say, files that have not been edited yet, together with the values of UIDs, NIDs, and PIDs. These files include five moving image files "MVI_0001.MP4" to "MVI_0005.MP4", which are joined via UIDs, NIDs, and PIDs through the above-described recording processing, and a moving image file VMI_0006.MP4 that has been recorded independently.

The file "MVI_0001.MP4" has a UID of "1111". Also, it has an NID of "1112" as the later-described "MVI_0002.MP4" exists as the next file. Furthermore, it has a PID of "0000" as a preceding file does not exist.

The file "MVI_0002.MP4" has a UID of "1112". Also, it has an NID of "1113" as the later-described "MVI_0003.MP4" exists as the next file. Furthermore, it has a PID of "1111" as the above-described "MVI_0001.MP4" exists as a preceding file.

The file "MVI_0003.MP4" has a UID of "1113". Also, it has an NID of "1114" as the later-described "MVI_0004.MP4" exists as the next file. Furthermore, it has a PID of "1112" as the above-described "MVI_0002.MP4" exists as a preceding file.

The file "MVI_0004.MP4" has a UID of "1114". Also, it has an NID of "1115" as the later-described "MVI_0005.MP4" exists as the next file. Furthermore, it has a PID of "1113" as the above-described "MVI_0003.MP4" exists as a preceding file.

The file "MVI_0005.MP4" has a UID of "1115". Also, it has an NID of "0000" as the next file does not exist. Furthermore, it has a PID of "1114" as the above-described "MVI_0004.MP4" exists as a preceding file.

The file "MVI_0006.MP4" is an independently recorded file, and hence has a UID of "1116", an NID of "0000", and a PID of "0000".

With the foregoing file structure, the control unit 102 displays an index reproduction screen 901 on the display unit 109 through the above-described reproduction processing (step S601). This index reproduction screen 901 displays a predetermined number of thumbnails of files targeted for reproduction as shown in FIGS. 10A to 10D2; specifically, thumbnail images of MVI_0001.MP4 to MVI_0006.MP4 are displayed in frames 9011 to 9016, respectively.

Next, in step S602, the control unit 102 detects a scene selection instruction provided by the user operating the operation unit 103, and displays a single reproduction screen 902 on the display unit 109.

Next, in step S603, the control unit 102 detects a reproduction function screen display instruction provided by the user operating the operation unit 103, and causes the user to select a display function, such as reproduction, editing, and scene switch, by displaying a reproduction function selection screen 903 on the display unit 109.

The following describes, as one example, a sequence in which the scene selection instruction has been provided with respect to the third thumbnail image displayed on the index reproduction screen 901, and hence "MVI_0003.MP4" is edited.

Although not particularly mentioned, a file path, a file number, and the like for allowing the user to recognize a target file is displayed so as to clarify the target of editing (on the reproduction function selection screen 903, "101CAMON\MVI_0003.MP4" is displayed). The reproduction function selection screen 903 may display a time-line and/or recording time indicating a recording time length of an entire moving image file that has been divided and recorded in single recording using numeric characters and symbols.

Thereafter, in step S604, if the user presses an "edit" button on the reproduction function selection screen 903 via the operation unit 103, the control unit 102 detects issuance of an editing selection instruction and proceeds to step S605. On the other hand, if the user presses a "delete" button on the reproduction function selection screen 903, the control unit 102 detects issuance of a deletion selection instruction and proceeds to step S608.

In step S605, the control unit 102 displays an editing screen 904 for the file targeted for editing ("MVI_0003.MP4") on the display unit 109, and proceeds to step S606. The editing screen 904 displays attribute information, such as a file name and a file number, for allowing the user to identify the selected file, as well as a time-line 904a and/or recording time indicating a recording time length from the start to the end of the selected file. The user can provide an instruction for an anterior cut editing point and a posterior cut editing point, which will be described later, by designating an arbitrary position on the time-line 904a by operating the operation unit 103. The same goes for anterior cut editing screens 905, 906 and posterior cut editing screens 907, 908, which will be described later.

It is permissible to display a time-line indicating a recording time length of an entire moving image file that has been divided and recorded in single recording up until the display of the reproduction function selection screen 903, and then switch to the display of the time-line 904a indicating the recording time length from the start to the end of the selected file upon display of the editing screen 904.

By thus switching the time-line display, the user can not only easily grasp the reproduction time of the entire target moving images at the time of reproducing the moving images, but also accurately designate specific positions of the anterior cut editing point, the posterior cut editing point, and the like while viewing the time-line solely dedicated for the selected file at the time of editing the moving images.

In step S606, the control unit 102 performs the following editing processing upon accepting various types of operation instructions from the user via the operation unit 103.

If the control unit 102 detects, on the editing screen 904, an anterior cut selection instruction provided by the user operating the operation unit 103, it displays an anterior cut editing screen 905 on the display unit 109. The anterior cut editing screen 905 is an editing setting screen that displays a frame image at an anterior cut editing point so as to allow the user to perform anterior cut editing with reference to this frame image.

If the control unit 102 further detects, on the anterior cut editing screen 905, an anterior cut editing point change instruction provided by the user operating the operation unit 103 with respect to a time-line 905a, it updates a position of the anterior cut editing point. Accordingly, it updates a position of an anterior cut editing point 961 on a time-line 906a as shown on the anterior cut editing screen 906, and displays a frame image at the anterior cut editing point.

If the control unit 102 detects, on the anterior cut editing screen 906, an anterior cut editing point setting instruction provided by the user operating the operation unit 103, it returns to the editing screen 904 and displays an updated anterior cut editing point 941 on the editing screen 904.

If the control unit 102 detects, on the editing screen 904, a posterior cut selection instruction provided by the user operating the operation unit 103, it displays a posterior cut editing screen 907 on the display unit 109. The posterior cut editing screen 907 is an editing setting screen that displays a frame image at a posterior cut editing point so as to allow the user to perform posterior cut editing with reference to this frame image.

If the control unit 102 detects, on the posterior cut editing screen 907, a posterior cut editing point change instruction provided by the user operating the operation unit 103 with respect to a time-line 907a, it updates a position of the posterior cut editing point. Accordingly, it updates a position of a posterior cut editing point 981 on a time-line 908a as shown on the posterior cut editing screen 908, and displays a frame image at the posterior cut editing point.

If the control unit 102 detects, on the posterior cut editing screen 908, a posterior cut editing point setting instruction provided by the user operating the operation unit 103, it returns to the editing screen 904 and displays an updated posterior cut editing point 942 on the editing screen 904.

If the control unit 102 detects, on the editing screen 904, a reproduction instruction provided by the user operating the operation unit 103, it displays an edited image reproduction screen 917 on which a section between the anterior cut editing point and the posterior cut editing point is extracted and reproduced.

If the control unit 102 detects, on the edited image reproduction screen 917, a stop instruction provided by the user operating the operation unit 103, it ends the edited image reproduction screen 917 and displays the editing screen 904.

It should be noted that the above-described processing can be performed continuously until execution of the editing processing is detected in determination processing of step S607.

Thereafter, if a storage selection instruction is provided on the editing screen 904 by the user operating the operation unit 103, the control unit 102 detects the storage selection instruction (step S607) and proceeds to step S608.

In step S608, the control unit 102 performs the following processing for editing moving image files upon accepting various types of operation instructions from the user via the operation unit 103.

First, in the case where the deletion selection instruction was detected in step S604, the control unit 102 deletes the file targeted for editing ("MVI_0003.MP4") and proceeds to step S609.

On the other hand, in the case where the editing selection instruction was detected in step S604, the control unit 102 edits the file targeted for editing ("MVI_0003.MP4") such that it is composed only of a section between the anterior cut editing point and the posterior cut editing point that were set in step S606, and proceeds to step S609.

Next, in step S609, the control unit 102 determines whether or not the file targeted for editing ("MVI_0003.MP4") is moving images that were joined via the above-described NIDs and PIDs at the time of recording; it proceeds to step S610 if the file targeted for editing is the joined moving images, and proceeds to step S613 otherwise.

In step S610, the control unit 102 determines whether or not deletion or anterior cut was performed in the processing for editing moving image files in step S608; it proceeds to step S611 if deletion or anterior cut was performed, and proceeds to step S613 otherwise.

In step S611, the control unit 102 determines whether or not a joined file exists previous to the file targeted for editing ("MVI_0003.MP4"); it proceeds to step S612 if such a file exists, and proceeds to step S613 otherwise. In this determination of whether or not a joined file exists previous to the file targeted for editing ("MVI_0003.MP4"), the PID "1112" of the file targeted for editing ("MVI_0003.MP4") is referred to, and whether or not a file with a UID "1112" indicated by the PID exists is determined. In the present example, the file "MVI_0002.MP4" with the UID "1112", which is shown in FIG. 10A, is detected.

In step S612, the control unit 102 performs processing for deleting preceding joined files ("MVI_0001.MP4" and "MVI_0002.MP4").

With reference to FIG. 7, the following describes the processing for deleting the preceding joined files in step S612 of FIG. 6.

First, processing for displaying an anterior cut scene deletion selection screen 909 for the file targeted for editing ("MVI_0003.MP4") is performed in step S701, and then step S702 follows. The anterior cut scene deletion selection screen 909 displays the preceding joined files ("MVI_0001.MP4" and "MVI_0002.MP4"), which are scenes preceding the file targeted for editing ("MVI_0003.MP4"). The user can provide an instruction indicating whether or not to delete the scenes while viewing this anterior cut scene deletion selection screen 909.

At this time, in the present embodiment, one representative image representing the start of the preceding joined files ("MVI_0001.MP4") is displayed as an example. Alternatively, all of these joined files may be displayed in a list.

In step S702, a selection instruction is accepted from the user on the anterior cut scene deletion selection screen 909. Thereafter, steps S703, S704, and S705 follow if the selection instruction from the user is a reproduction selection instruction, a deletion selection instruction, and a no-deletion selection instruction, respectively.

In step S703, the control unit 102 displays an anterior cut scene reproduction screen 910, performs processing for reproducing the preceding joined files ("MVI_0001.MP4" and "MVI_0002.MP4"), displays the anterior cut scene deletion selection screen 909 upon issuance of a reproduction stop instruction or completion of the reproduction, and returns to step S702. This processing allows the user to determine whether or not he/she will delete the anterior cut scenes while reproducing and checking the preceding joined files.

In step S704, the control unit 102 displays an anterior cut scene deletion-in-progress screen 911, and performs processing for deleting the preceding joined files ("MVI_0001.MP4" and "MVI_0002.MP4"). In this deletion processing, first of all, the files targeted for deletion ("MVI_0001.MP4" and "MVI_0002.MP4") in a joined file group are deleted. Then, the PID "1112" of the file targeted for editing ("MVI_0003.MP4") is re-written to an invalid value "0000". When the above processing is ended, an anterior cut scene deletion completion screen 912 is displayed; then, after the user has checked the completion and provided an instruction accordingly, step S613 follows.

In step S705, the control unit 102 performs processing for re-setting a group boundary for the preceding joined files ("MVI_0001.MP4" and "MVI_0002.MP4"). In the processing for re-setting the group boundary, first of all, the NID of the last one of the preceding joined files ("MVI_0002.MP4") is set to an invalid value of "0000". Furthermore, if the file targeted for editing ("MVI_0003.MP4") exists, the PID "1112" of the file targeted for editing ("MVI_0003.MP4") is set to "0000", thereby deleting a joint attribute.

As a result of the above-described processing for deleting a joint attribute associated with the preceding joined files ("MVI_0001.MP4" and "MVI_0002.MP4") via the NIDs and PIDs, in the case where deletion was performed in step S608, the values of NIDs and PIDs shown in FIG. 10B1 are set. In the case where anterior cut was performed in step S608, NIDs and PIDs shown in FIG. 10C1 are set. In the case where anterior cut and posterior cut were performed in step S608, NIDs and PIDs shown in FIG. 10D1 are set.

This makes it possible to update the joint relationship between the file targeted for editing ("MVI_0003.MP4") and a preceding joined file ("MVI_0002.MP4"), which became discontinuous in time-series as a result of the anterior cut processing or the deletion processing.

After the processing from step S701 to step S705 is ended, step S613 follows.

While the present embodiment determines which one of the aforementioned deletion processing in step S704 and the aforementioned group boundary re-setting processing in step S705 is to be performed by way of a selection instruction from the user, it is possible to determine which processing is to be performed in accordance with attribute information given to the file targeted for editing ("MVI_0003.MP4") and to an external management file.

Next, in step S613, the control unit 102 determines whether or not deletion or posterior cut was performed in the processing for editing moving image files in step S608; it proceeds to step S614 if deletion or posterior cut was performed, and ends the processing if neither of them was performed.

In step S614, the control unit 102 determines whether or not a joined file exists subsequent to the file targeted for editing ("MVI_0003.MP4"); it proceeds to step S615 if such a file exists, and ends the processing if such a file does not exist. In this determination of whether or not a joined file exists subsequent to the file targeted for editing ("MVI_0003.MP4"), the NID "1114" of the file targeted for editing ("MVI_0003.MP4") is referred to, and whether or not a file with a UID "1114" indicated by the NID exists is determined. In the present example, the file "MVI_0004.MP4" with the UID "1114", which is shown in FIG. 10A, is detected.

Next, in step S615, the control unit 102 performs processing for deleting a joint attribute associated with succeeding joined files ("MVI_0004.MP4" and "MVI_0005.MP4") via NIDs and PIDs.

With reference to FIG. 8, the following describes the processing for deleting the succeeding joined files in step S615 of FIG. 6.

First, processing for displaying a posterior cut scene deletion selection screen 913 for the file targeted for editing ("MVI_0003.MP4") is performed in step S801, and then step S802 follows.

The posterior cut scene deletion selection screen 913 displays the succeeding joined files ("MVI_0004.MP4" and "MVI_0005.MP4"), which are scenes succeeding the file targeted for editing ("MVI_0003.MP4"). The user can provide an instruction indicating whether or not to delete the scenes while viewing this posterior cut scene deletion selection screen 913. At this time, in the present embodiment, one representative image representing the start of the succeeding joined files ("MVI_0004.MP4") is displayed as an example. Alternatively, all of these joined files may be displayed in a list.

Next, in step S802, the control unit 102 determines a selection instruction that was accepted from the user via the operation unit 103 with respect to the posterior cut scene deletion selection screen 913. Thereafter, steps S803, S804, and S805 follow if the selection instruction from the user is a reproduction selection instruction, a deletion selection instruction, and a no-deletion selection instruction, respectively.

In step S803, the control unit 102 displays a posterior cut scene reproduction screen 914, and performs processing for reproducing the succeeding joined files ("MVI_0004.MP4" and "MVI_0005.MP4"). The control unit 102 displays the posterior cut scene deletion selection screen 913 upon issuance of a reproduction stop instruction or completion of the reproduction, and returns to step S802. This processing allows the user to determine whether or not he/she will delete the posterior cut scenes while reproducing and checking the succeeding joined files.

In step S804, the control unit 102 displays a posterior cut scene deletion-in-progress screen 915, and performs processing for deleting the succeeding joined files ("MVI_0004.MP4" and "MVI_0005.MP4"). In this deletion processing, first of all, the files targeted for deletion ("MVI_0004.MP4" and "MVI_0005.MP4") in a joined file group are deleted. Then, the NID "1114" of the file targeted for editing ("MVI_0003.MP4") is re-written to an invalid value "0000".

When the above processing is ended, a posterior cut scene deletion completion screen 916 is displayed; then, after the user has checked the completion and provided an instruction accordingly, the processing is ended.

In step S805, the control unit 102 performs processing for re-setting a group boundary for the succeeding joined files ("MVI_0004.MP4" and "MVI_0005.MP4"). In the processing for re-setting the group boundary, first of all, the PID of the first one of the succeeding joined files ("MVI_0004.MP4") is set to an invalid value of "0000". Furthermore, if the file targeted for editing ("MVI_0003.MP4") exists, the NID "1114" of the file targeted for editing ("MVI_0003.MP4") is set to "0000", thereby deleting a joint attribute.

As a result of the above-described processing for deleting a joint attribute associated with the succeeding joined files ("MVI_0004.MP4" and "MVI_0005.MP4") via the NIDs and PIDs, in the case where deletion was performed in step S608, the values of NIDs and PIDs shown in FIG. 10B2 are set. In the case where posterior cut was performed in step S608, NIDs and PIDs shown in FIG. 10C2 are set. In the case where anterior cut and posterior cut were performed in step S608, NIDs and PIDs shown in FIG. 10D2 are set.

This makes it possible to update the joint relationship between the file targeted for editing ("MVI_0003.MP4") and a succeeding joined file ("MVI_0004.MP4"), which became discontinuous in time-series as a result of the posterior cut processing or the deletion processing.

After the processing from step S801 to step S805 is ended, the sequence of editing processing is ended, switching over to the single reproduction screen 902.

While the present embodiment determines which one of the aforementioned deletion processing in step S804 and the aforementioned group boundary re-setting processing in step S805 is to be performed by way of a selection instruction from the user, it is possible to determine which processing is to be performed in accordance with attribute information given to the file targeted for editing ("MVI_0003.MP4") and to an external management file.

While a single reproduction screen for reproducible moving images is displayed after the sequence of editing processing is ended in the present embodiment, the index reproduction screen 901 may be displayed. Furthermore, in the case where, for example, no moving image file exists through the sequence of editing processing, it is permissible to display a separate screen indicating the non-existence of the file.

As has been described above, when editing a plurality of files that have been divided and recorded in single recording, the user can comprehensively delete a file that precedes or succeeds an anterior cut editing point or a posterior cut editing point, even if he/she intended to edit only one file.

Furthermore, according to the above-described editing processing, when an edited moving image file group is reproduced again, joint relationships between the moving image files are corrected in accordance with time-series continuity between the files. In this way, unnecessary continuous reproduction is not performed, and the burden of merging the files can be eliminated when the user performs a reproduction operation.

While the present embodiment has exclusively discussed continuity in time-series, joint factors need not particularly be time-series factors, and similar embodiments are easily realized for joining of a plurality of files in a predetermined order or relationship (they need not be continuous), and joining of files according to other joint factors.

It should be noted that a single item of hardware may control the control unit 102, or a plurality of items of hardware may control the entire apparatus by sharing processing.

While the present invention has been elaborated above based on a suitable embodiment thereof, the present invention is by no means limited to such a specific embodiment and includes various modes without departing from the concept of the present invention. The above-described embodiment is merely an illustrative embodiment of the present invention, and various embodiments may be combined where appropriate. For example, while the processing from step S609 to step S615 is performed after performing the processing for editing moving image files in step S608 in the present embodiment, the present invention includes a scenario in which the processing for editing moving image files is performed in step S608 after updating the joint relationships between the files in steps S609 to S615.

While the above embodiment has described an exemplary case where the present invention is applied to a recording apparatus for recording moving image data and audio data into a recording medium, the present invention is not limited to this exemplary case and is applicable to any editing apparatus that can edit moving images and audio.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-106592, filed May 20, 2013 which is hereby incorporated by reference herein in its entirety.

What is claimed is:

1. An editing apparatus comprising:
   a selection unit configured to select one file included from a group of a plurality of files of predetermined continuity;
   a first instruction detection unit configured to detect a first instruction for deleting an anterior portion of time-series data in the file selected by the selection unit, the anterior portion preceding a designated position in time-series; and
   a processing unit configured to, if the first instruction is detected by the first instruction detection unit, perform processing for deleting a file preceding the selected file from the group of the plurality of files.

2. An editing apparatus comprising:
   a selection unit configured to select one file included from a group of a plurality of files of predetermined continuity;
   a second instruction detection unit configured to detect a second instruction for deleting a posterior portion of time-series data in the file selected by the selection unit, the posterior portion succeeding a designated position in time-series; and
   a processing unit configured to, if the second instruction is detected by the second instruction detection unit, delete a file succeeding the selected file from the group of the plurality of files.

3. The apparatus according to claim 1, further comprising a second instruction detection unit configured to detect a second instruction for deleting a posterior portion of the time-series data in the file selected by the selection unit, the posterior portion succeeding a designated position in time-series,
   wherein if the second instruction is detected by the second instruction detection unit, the processing unit deletes a file succeeding the selected file from the group of the plurality of files.

4. The apparatus according to claim 1,
   wherein the processing unit re-writes a joint relationship between the file selected by the selection unit and a file succeeding the selected file.

5. The apparatus according to claim 1,
   wherein in accordance with an instruction from a user, the processing unit performs one of processing for rewiring a joint relationship between the file selected by the selection unit and a file preceding or succeeding the selected file, and processing for deleting the file preceding or succeeding the selected file.

6. The apparatus according to claim 1, further comprising an acquisition unit configured to acquire attribute information of the file selected by the selection unit from a file system or from an external management file,
   wherein based on the attribute information acquired by the acquisition unit, the processing unit performs one of processing for re-wiring a joint relationship between the file selected by the selection unit and a file preceding or succeeding the selected file, and processing for deleting the file preceding or succeeding the selected file.

7. The apparatus according to claim 1, further comprising a reproduction unit configured to, prior to deletion of a file preceding or succeeding the file selected by the selection unit, reproduce the file targeted for deletion.

8. The apparatus according to claim 1, further comprising an acceptance unit configured to accept the first instruction from a user.

9. The apparatus according to claim 8, further comprising a display control unit configured to, when the acceptance unit accepts the first instruction, display a time-line from a start to an end of the selected file.

10. The apparatus according to claim 9,
    the acceptance unit accepts designation of an origin of the portion to be deleted by the first instruction through designation of a position with respect to the time-line.

11. The apparatus according to claim 9,
    wherein the display unit displays attribute information for allowing the user to identify the file selected by the selection unit.

12. The apparatus according to claim 1,
    wherein if the first instruction is detected, the processing unit does not perform processing for deleting a file that is not included in the same group as the file selected at the time of the first instruction, even if the file that is not included in the same group has been recorded prior to the file selected at the time of the first instruction.

13. The apparatus according to claim 12,
    wherein the processing unit determines whether or not a file is included in the same group based on identification information of preceding and succeeding files that is added to the file.

14. The apparatus according to claim 12,
    wherein the group is a file group that has been divided and recorded in single recording.

15. A control method of an editing apparatus comprising:
    a selection step of selecting one file included from a group of a plurality of files of predetermined continuity;
    a first instruction detection step of detecting a first instruction for deleting an anterior portion of time-series data in the file selected in the selection step, the anterior portion preceding a designated position in time-series; and
    a processing step of, if the first instruction is detected in the first instruction detection step, performing processing for deleting a file preceding the selected file from the group of the plurality of files.

16. A control method of an editing apparatus comprising:
    a selection step of selecting one file included from a group of a plurality of files of predetermined continuity;
    a second instruction detection step of detecting a second instruction for deleting a posterior portion of time-series data in the file selected in the selection step, the posterior portion succeeding a designated position in time-series; and
    a processing step of, if the second instruction is detected in the second instruction detection step, deleting a file succeeding the selected file from the group of the plurality of files.

17. A non-transitory computer-readable storage medium storing a program for causing a computer to execute the control method according to claim 15.

18. A non-transitory computer-readable storage medium storing a program for causing a computer to execute the control method according to claim 16.

* * * * *